US006414810B1

United States Patent
Bollati et al.

(10) Patent No.: US 6,414,810 B1
(45) Date of Patent: Jul. 2, 2002

(54) READ CHANNEL EQUALIZATION WITH ENHANCED SIGNAL TO NOISE RATIO

(75) Inventors: Giacomino Bollati, Castel San Giovanni; Melchiorre Bruccoleri, Rho; Salvatore Portaluri, Pavia; Luca Celant, Milan, all of (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/301,192

(22) Filed: Apr. 28, 1999

(30) Foreign Application Priority Data

Apr. 29, 1998 (EP) .............................. 98830259

(51) Int. Cl.⁷ ............................................. G11B 5/035
(52) U.S. Cl. ............................................ 360/65; 360/46
(58) Field of Search ................................. 360/65, 46

(56) References Cited

U.S. PATENT DOCUMENTS

| | | | |
|---|---|---|---|
| 5,235,540 A | 8/1993 | DeVierman | 364/825 |
| 5,682,125 A | * 10/1997 | Minuhin et al. | 333/18 |
| 5,684,651 A | 11/1997 | Yaegashi et al. | 360/77.08 |
| 6,067,198 A | * 5/2000 | Zuffada et al. | 360/46 |
| 6,141,168 A | * 10/2000 | Takahashi et al. | 360/66 |

FOREIGN PATENT DOCUMENTS

EP 0961269 A1 * 1/1999 ........... G11B/20/00

OTHER PUBLICATIONS

Krause, Solid State Radio Engineering, 1980, pp. 28–29. USA XP002078791, John Wiley & Sons.

* cited by examiner

*Primary Examiner*—David Hudspeth
*Assistant Examiner*—Dan I. Davidson
(74) *Attorney, Agent, or Firm*—Lisa K. Jorgenson; Allen, Dyer, Doppelt, Milbrath & Gilchrist, P.A.

(57) ABSTRACT

A method of equalizing a read channel of a mass magnetic memory device comprises attenuating the low frequencies of the spectrum of the analog signal originating from an electromagnetic read transducer without boosting the high frequency harmonic components of the spectrum. The low frequencies of the spectrum of the analog input signal are attenuated with a low pass filter of an order in a range from 6 to 8 and a boost is implemented by introducing two real and opposed zeroes in the transfer function of the filter without altering the group delay.

18 Claims, 3 Drawing Sheets

READ CHANNEL EQUALIZATION WITH ENHANCED SIGNAL TO NOISE RATIO

FIELD OF THE INVENTION

The present invention relates in general to processing circuits of analog signals. In particular, the invention relates to circuits for processing analog signals originating from electromagnetic transducers or heads reading data stored in magnetic media, for example, in read channels of Hard Disk Drives (HDD).

BACKGROUND OF THE INVENTION

In data reading systems (also referred to as read channels) from magnetic mass memories such as hard disks (HD), tapes, floppy disks, etc., used in personal computers, it is desired to ensure the highest possible signal to noise ratio (SNR), for reasons of reliability and data transfer speed. Depending on the class of read channel (PR4, EPR4, EEPR4, . . . ) the requirements are relatively stringent. Although, along the analog signal path originating from a read head, it is necessary to provide a pre-equalization to accentuate the gain of the read channel in the frequency range where the signal's energy reaches its maximum energy.

A typical functional schematic of an HDD read channel is illustrated in FIG. 1. As shown in the example of FIG. 1, the read channels commonly have an automatic gain control circuit (AGC) realized through a variable gain amplifier VGA controlled through a digital/analog converter DAC__VGA. This is done to keep constant the amplitude of the signal supplied to the input of the analog/digital converter ATOD, regardless of the amplitude of the input signal and of the gain of the filter in the signal band. The Magnetic Resistive Asymmetry MRA block has the function of eliminating, or at least attenuating, the second harmonic (that is the contribution given by the term $\alpha x^2$) of the analog input signal originating from the read head MR. This spectrum correction operation on the signal is dynamically controlled through the digital/analog converter DAC__MRA.

Depending on the equalization required for the particular transducer's characteristics, the boost of the low pass filter transfer function may be programmed through the DAC__BOOST block, and the filter's cut-off through the DAC__FC converter. The two converters convert programming digital commands (Word FC and Word Boost) into analog control signals for the transfer function of the low pass filter. In cascade to the low pass filter LPF there is an OFFSET STAGE capable of eliminating the eventual offset existing at the output of the equalizing low pass filter LPF. Even for this stage, a programmable control is implemented by the use of a DIGITAL POST PROCESSING block through the digital/analog converter DAC__OFF.

The DIGITAL POST PROCESSING block acts through the control loop realized by the DAC converter and by the voltage controlled oscillator VCO to maintain a correct sampling synchronization by the ATOD converter.

In known systems, the amplitude of the output signal of the VGA block depends on the programmed boost. In practice, the higher the programmed boost, the higher the band gain and therefore the system intervenes to reduce the amplitude of the signal output by the VGA block. Therefore, when a certain application requires high boost values, a part of the analog processing section operates with a signal amplitude relatively lower (lower level of the signal output by the variable gain amplifier VGA). Because the internal noise of the VGA amplifier stage does not depend on the signal amplitude, the signal to noise ratio (SNR) is diminished under these operating conditions.

Traditionally, all these systems or read channels implement pre-equalization, though partial, by modifying the transfer function of the low pass filter LPF. This is done by programming the boost through the DAC__BOOST block and the cut-off frequency trough the DAC__FC block, as shown in FIG. 2.

SUMMARY OF THE INVENTION

It has now been found that it is possible to prevent a reduction of the signal to noise ratio (SNR) even for those applications requiring a significant increment of the boost of the transfer function of the low pass filter. This is done by avoiding incrementation of the gain for high frequency harmonic components, while attenuating the low frequencies for modifying the spectrum of the signal originating from the read heads. In this way, by not reducing the amplitude of the signal output by the VGA amplifier stage as in traditional systems, to compensate for the reduced gain in the low pass filter band, a net improvement of the signal to noise ratio is obtained. In practice, this is obtained by modifying the profile of the transfer function profile of the low pass filter.

DETAILED DESCRIPTION OF THE PREFERRED EMBODIMENT

Figure 1:
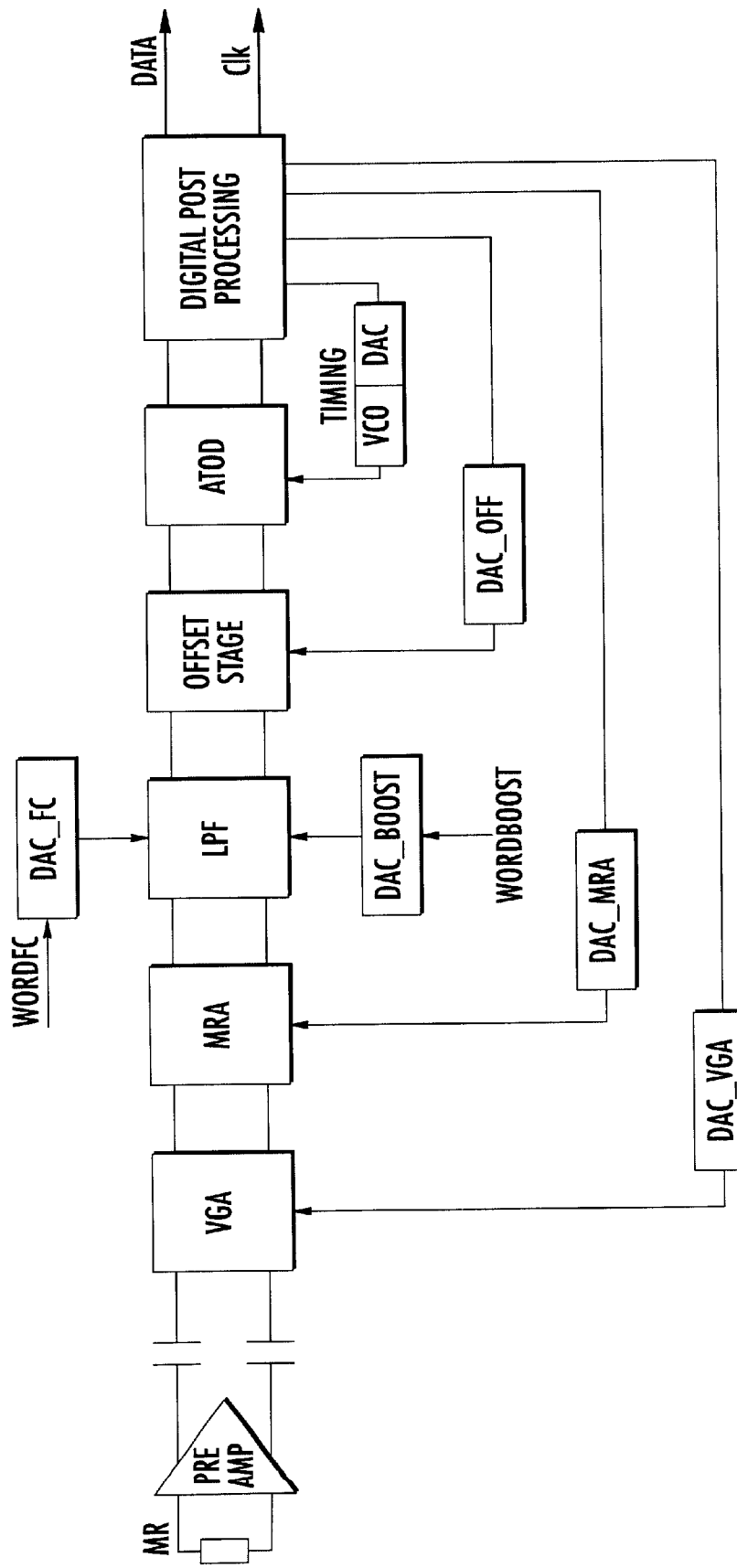
FIG. 1 shows the block diagram of a prior art HDD read channel, as described above.
Figure 2:
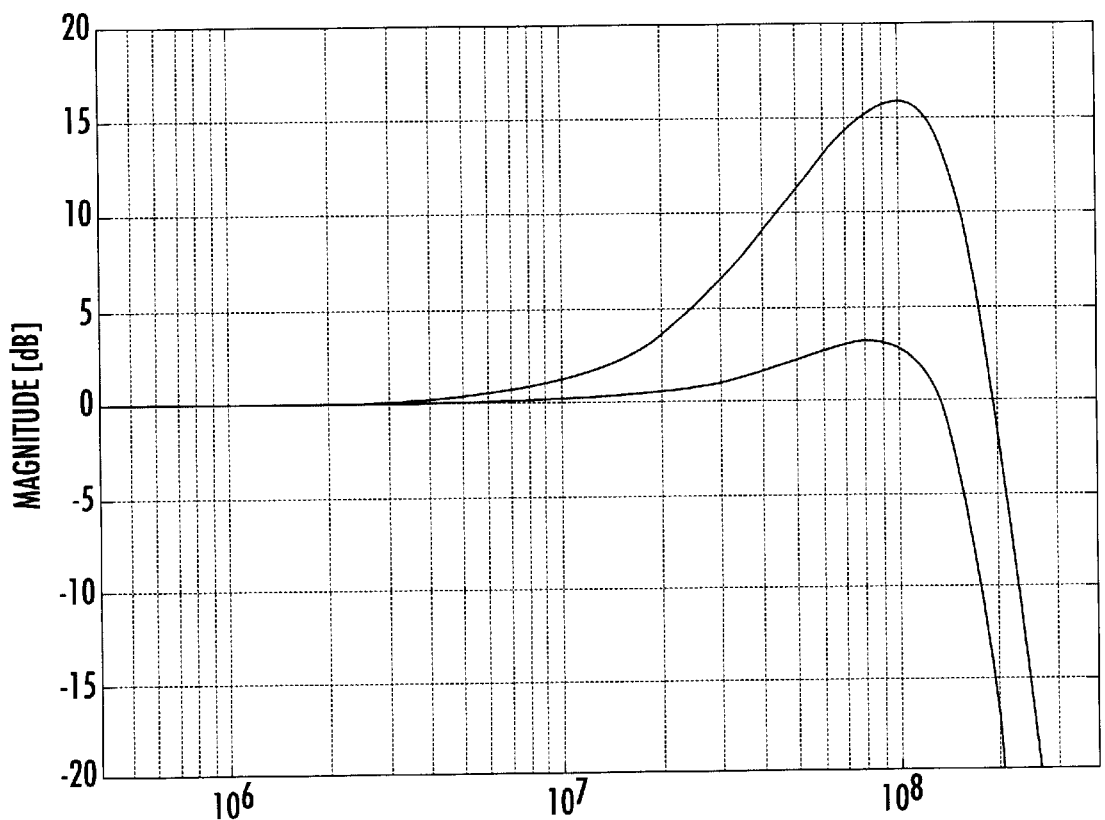
FIG. 2 shows a prior art equalization scheme through the adjustment of the cut off frequency and of the boost, as described above.
Figure 3:
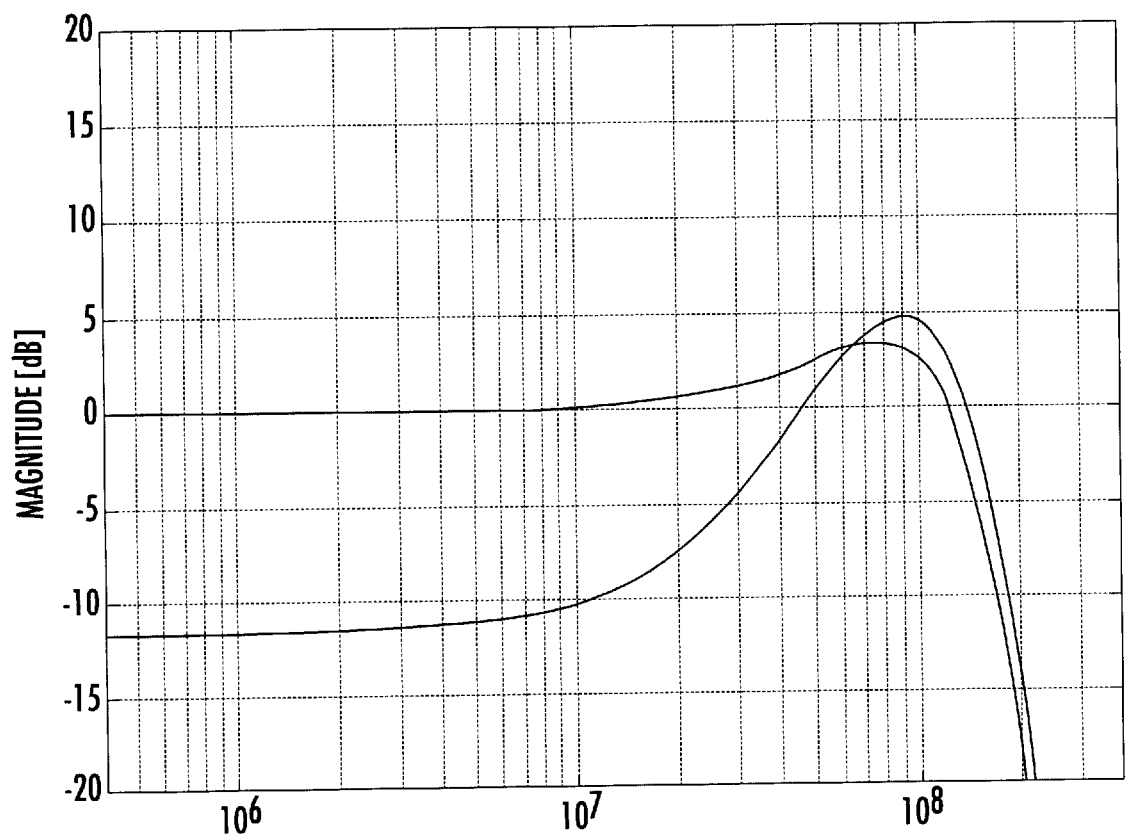
FIG. 3 shows an equalization scheme according to the present invention.

According to this invention, equalization is implemented by using a low pass filter LPF of an order in a range from 6 to 8. The LPF filter may be easily realized in the form of a cascade of bi-quadratic cells, each with a cut-off frequency and boost programmable through control converters DAC__FC and DAC__BOOST.

The boost is obtained by introducing, in the low pass filter transfer function, two real and opposed zeros to avoid altering the group delay: $d\phi/df$, where $\phi$ is the phase of the transfer function. The transfer function of the low pass filter LPF block of a system made according to the invention may be expressed by:

$$H(S)=H_N(S)*(a-b*S^2)$$

Where $H_N(S)$ is the transfer function of the N bi-quadratic cells and the term $(a-b*S^2)$ represents the two real and opposed zeroes that are introduced. By decreasing the factor a, an attenuation at the low frequencies is introduced while maintaining a high signal to noise ratio.

That which is claimed is:

1. A method of equalizing a read channel of a magnetic mass memory device, comprising the steps of:

receiving an analog signal originating from an electromagnetic read transducer;

attenuating low frequencies of a spectrum of the analog signal without boosting high frequency harmonic components of the spectrum.

2. A method according to claim 1, wherein the attenuating step comprises attenuating the low frequencies of the spectrum of the analog input signal with a low pass filter of an order in a range from 6 to 8.

3. A method according to claim 2, wherein the low pass filter comprises a cascade of N bi-quadratic cells and a transfer function of the low pass filter is expressed by:

$$H(S)=H_N(S)*(a-b*S^2)$$

where $H_N(S)$ is the transfer function of the N bi-quadratic cells and $(a-b*S^2)$ represents two real and opposed zeroes that are introduced, and further comprising the step of decreasing "a" to attenuate the low frequencies while maintaining a high signal to noise ratio.

4. A method according to claim 1, wherein the attenuating step comprises determining a boost by introducing two real and opposed zeroes in a transfer function of a low pass filter, without altering a group delay.

5. A method of equalizing a read channel of a magnetic mass memory device, comprising:
   receiving an analog signal originating from an electromagnetic read transducer; and
   attenuating low frequencies of a spectrum of the analog signal with a low pass filter of an order in a range from 6 to 8;
      wherein the low pass filter comprises a cascade of N bi-quadratic cells and a transfer function of the low pass filter is expressed by:

$$H(S)=H_N(S)*(a-b*S^2)$$

where $H_N(S)$ is the transfer function of the N bi-quadratic cells and $(a-b*S^2)$ represents two real and opposed zeroes that are introduced, and further comprising the step of decreasing "a" to attenuate the low frequencies while maintaining a high signal to noise ratio.

6. A method of equalizing a read channel of a magnetic mass memory device, comprising:
   receiving an analog signal originating from an electromagnetic read transducer; and
   attenuating low frequencies of a spectrum of the analog signal with a low pass filter of an order in a range from 6 to 8;
      wherein the attenuating step comprises determining a boost by introducing two real and opposed zeroes in a transfer function of the low pass filter, without altering a group delay, and wherein the low frequencies are attenuated without boosting high frequency harmonic components of the spectrum.

7. A method of equalizing a read channel of a magnetic mass memory device, comprising the steps of:
   receiving an analog signal originating from an electromagnetic read transducer;
   attenuating low frequencies of a spectrum of the analog signal by introducing two real and opposed zeroes in a transfer function of a low pass filter, without altering a group delay and without boosting high frequency harmonic components of the spectrum.

8. A method according to claim 7, wherein the low pass filter is of an order in a range from 6 to 8, and comprises a cascade of N bi-quadratic cells, and the transfer function of the low pass filter is expressed by:

$$H(S)=H_N(S)*(a-b*S^2)$$

where $H_N(S)$ is the transfer function of the N bi-quadratic cells and $(a-b*S^2)$ represents two real and opposed zeroes that are introduced; and further comprising the step of decreasing "a" to attenuate the low frequencies while maintaining a high signal to noise ratio.

9. A data read channel for an analog signal originating from a read transducer of a magnetic mass memory device, the data read channel comprising:
   a low pass filter;
   a cut-off frequency controller for controlling the cut-off frequency of the low pass filter; and
   a boost controller for controlling the boost of the low pass filter;
   the cut-off frequency controller and the boost controller cooperating so that low frequencies of a spectrum of the analog signal are attenuated without boosting high frequency harmonic components of the spectrum.

10. A data read channel according to claim 9, wherein the low pass filter is of an order in a range from 6 to 8 and comprises a cascade of N bi-quadratic cells, and a transfer function of the low pass filter is expressed by:

$$H(S)=H_N(S)*(a-b*S^2)$$

where $H_N(S)$ is the transfer function of the N bi-quadratic cells and $(a-b*S^2)$ represents two real and opposed zeroes that are introduced in the transfer function.

11. A data read channel according to claim 9, further comprising:
   a variable gain amplifier, upstream of the low pass filter, for keeping the amplitude of the analog signal constant; and
   a magnetic resistive asymmetry circuit, between the variable gain amplifier and the low pass filter, for attenuating a second harmonic of the analog signal.

12. A data read channel according to claim 9, further comprising:
   an offset circuit for eliminating an offset at an output of the low pass filter; and
   an analog/digital converter, downstream of the offset circuit, for converting the analog signal to a digital signal.

13. A data read channel according to claim 12, further comprising:
   a digital post processor to maintain a correct sampling synchronization by the analog/digital converter.

14. A memory device comprising:
   a magnetic mass memory;
   at least one electromagnetic read transducer, associated with the magnetic mass memory, for producing an analog signal; and
   at least one read channel connected to the at least one electromagnetic read transducer, the at least one read channel comprising
      a low pass filter,
      a cut-off frequency controller for controlling the cut-off frequency of the low pass filter, and
      a boost controller for controlling the boost of the low pass filter,
      the cut-off frequency controller and the boost controller cooperating so that low frequencies of a spectrum of the analog signal are attenuated without boosting high frequency harmonic components of the spectrum.

15. A memory device according to claim 14, wherein the low pass filter is of an order in a range from 6 to 8 and comprises a cascade of N bi-quadratic cells, and a transfer function of the low pass filter is expressed by:

$$H(S)=H_N(S)*(a-b*S^2)$$

where $H_N(S)$ is the transfer function of the N bi-quadratic cells and $(a-b*S^2)$ represents two real and opposed zeroes that are introduced in the transfer function.

16. A memory device according to claim 14, wherein the at least one read channel further comprises:
- a variable gain amplifier, upstream of the low pass filter, for keeping the amplitude of the analog signal constant; and
- a magnetic resistive asymmetry circuit, between the variable gain amplifier and the low pass filter, for attenuating a second harmonic of the analog signal.

17. A memory device according to claim 14, wherein the at least one read channel further comprises:
- an offset circuit for eliminating an offset at an output of the low pass filter; and
- an analog/digital converter, downstream of the offset circuit, for converting the analog signal to a digital signal.

18. A memory device according to claim 17, wherein the at least one read channel further comprises:
- a digital post processor to maintain a correct sampling synchronization by the analog/digital converter.

* * * * *